United States Patent
Hayashi et al.

(10) Patent No.: US 9,987,959 B2
(45) Date of Patent: Jun. 5, 2018

(54) SEAT COVER AND VEHICLE SEAT

(71) Applicant: TOYOTA BOSHOKU KABUSHIKI KAISHA, Aichi-ken (JP)

(72) Inventors: Nobuki Hayashi, Aichi-ken (JP); Katsuhito Yamauchi, Aichi-ken (JP)

(73) Assignee: TOYOTA BOSHOKU KABUSHIKI KAISHA, Aichi-Ken (JP)

( * ) Notice: Subject to any disclaimer, the term of this patent is extended or adjusted under 35 U.S.C. 154(b) by 0 days. days.

(21) Appl. No.: 15/162,906

(22) Filed: May 24, 2016

(65) Prior Publication Data

US 2016/0347221 A1 Dec. 1, 2016

(30) Foreign Application Priority Data

May 26, 2015 (JP) ................... 2015-106636

(51) Int. Cl.
   *B60N 2/58* (2006.01)
   *B60N 2/48* (2006.01)

(52) U.S. Cl.
   CPC ............. *B60N 2/5816* (2013.01); *B60N 2/48* (2013.01)

(58) Field of Classification Search
   CPC .................................. B60N 2/48; B60N 2/5816
   USPC ...... 297/228.1, 228.11, 228.12, 228.13, 229, 297/218.1, 218.2, 218.3, 218.4, 218.5, 297/452.61
   See application file for complete search history.

(56) References Cited

U.S. PATENT DOCUMENTS

| | | | |
|---|---|---|---|
| 3,647,260 A * | 3/1972 | Grant | A47C 7/185 297/218.1 |
| 4,357,723 A * | 11/1982 | Zelkowitz | A47C 3/12 297/218.1 |
| 4,660,888 A * | 4/1987 | Urai | A47C 31/11 297/218.4 |
| 4,844,539 A * | 7/1989 | Selbert | B60N 2/60 297/228.13 X |
| 5,499,859 A * | 3/1996 | Angell | B60N 2/70 297/218.3 |
| 5,702,159 A * | 12/1997 | Matsuoka | A47C 7/18 297/218.2 |
| 6,048,026 A * | 4/2000 | Barnett | B60N 2/6081 297/229 |
| 6,050,639 A * | 4/2000 | Horn | B60N 2/5875 297/228.1 |
| 7,823,980 B2 * | 11/2010 | Niwa | B60N 2/5891 297/218.2 |
| 8,944,515 B2 * | 2/2015 | Kono | B60N 2/64 297/218.3 |
| 9,751,443 B2 * | 9/2017 | Tabata | B60N 2/646 |
| 2003/0085598 A1 * | 5/2003 | Monday | B60N 2/6036 297/228.12 |
| 2016/0096462 A1 * | 4/2016 | Kromm | B60N 2/5816 297/452.38 |

FOREIGN PATENT DOCUMENTS

JP     2012-187254     10/2012

\* cited by examiner

*Primary Examiner* — Rodney B White
(74) *Attorney, Agent, or Firm* — Greenblum & Bernstein, P.L.C.

(57) ABSTRACT

A seat cover of a vehicle seat configured to cover an outer surface of a seat pad, wherein a part of the seat cover which is configured to cover at least a seating surface of the seat pad consists of a seating surface piece made of a piece of cloth, and wherein, when covering the outer surface of the seat pad, the seat cover is bonded only to the seating surface.

2 Claims, 5 Drawing Sheets

SEAT COVER AND VEHICLE SEAT

CROSS-REFERENCE TO RELATED APPLICATIONS

This application claims priority from Japanese Patent Application No. 2015-106636 filed on May 26, 2015, the entire contents of which are incorporated herein by reference.

TECHNICAL FIELD

The present disclosure relates to a seat cover of a vehicle seat and the vehicle seat.

BACKGROUND

A vehicle seat (hereinafter, simply referred to as a "seat") such as an automobile seat has a seat frame constituting a framework of the seat and a seat pad defining an outer shape of the seat. Furthermore, an entire outer surface of the seat pad is covered with a seat cover in order to improve design. At this time, the seat cover is required to be brought into close contact along a three-dimensional shape (irregular shape) of the seat pad. Therefore, in related art, as shown in, for example, JP-A-2012-187254, the seat cover including a part covering a seating surface is configured by a large number of small subdivision pieces so as to match the three-dimensional shape of the seat pad. Meanwhile, peripheral edges of each piece are sutured to each other to form one piece of seat cover.

However, in the case where the seat cover is configured by a large number of small subdivision pieces as in the related art, a number of components is increased, and hence, a large effort is required to suture each piece. Further, typically, the seat cover is bonded to the seat pad. At this time, the portion of the seat cover bonded to the seat pad becomes hard by an adhesive, and hence, stretchability and flexibility thereof are lost. Therefore, depending on the bonding location or bonding range, there is a problem that a large effort is required to cover the seat pad with the seat cover, or the seat cover is difficult to follow the irregular shape of the seat pad, and hence, wrinkles easily occur.

SUMMARY

Aspects of the present disclosure provide a seat cover in which the number of components is decreased to reduce a suturing effort and which is easy to follow a three-dimensional shape of a seat pad, and a vehicle seat including the seat cover.

According to an aspect of the disclosure, there is provided a seat cover of a vehicle seat configured to cover an outer surface of a seat pad, wherein a part of the seat cover which is configured to cover at least a seating surface of the seat pad consists of a seating surface piece made of a piece of cloth, and wherein, when covering the outer surface of the seat pad, the seat cover is bonded only to the seating surface.

That is, a seat cover of a vehicle seat for covering an outer surface of a seat pad is provided. The seat cover has a part configured to cover at least a seating surface of the seat pad. The part of the seat cover consists of only a seating surface piece made of a piece of cloth. That is, the seating surface of the seat pad is covered by only one piece. Here, the "seating surface" refers to a surface on which an occupant's body and the seat are in contact when the occupant is seated in a normal posture. Specifically, a front surface in the case of a seat back or a headrest corresponds to the seating surface, and an upper surface in the case of a seat cushion corresponds to the seating surface. Further, in the case where side support portions are provided so as to bulge at both sides of the seat, an inside surface (a plane direction center-side surface with a seating surface as a reference) with top portions of the side support portions as a border corresponds to the seating surface. Further, when covering the outer surface of the seat pad with the seat cover, the seat cover is bonded only to the seating surface.

According to another aspect of the disclosure, there is provided a vehicle seat including: a seat pad having a seating surface; and a seat cover covering an outer surface of the seat pad and including: a first piece of cloth entirely covering the seating surface of the seat pad; and a second piece of cloth covering a portion of the outer surface of the seat pad which is not covered by the first piece of cloth, wherein the seat cover is bonded only to the seating surface.

DETAILED DESCRIPTION

Figure 1:
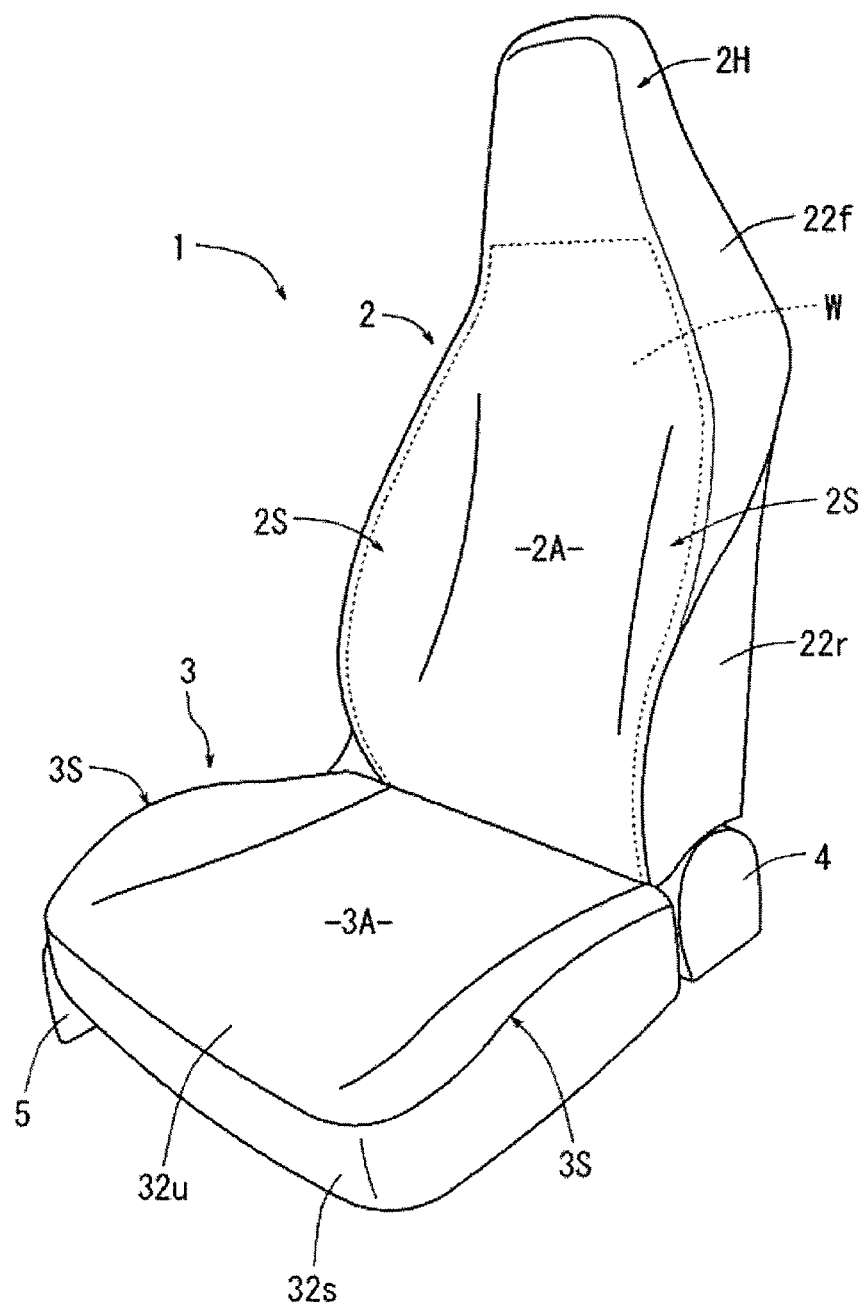
FIG. 1 is a perspective view of a seat.

As shown in FIG. 1, a seat 1 of the present embodiment has a seat back 2 serving as a backrest of an occupant and a seat cushion 3 supporting an occupant's hip portion. The seat 1 of the present embodiment is a vehicle seat such as an automobile seat. The seat back 2 is placed on the seat cushion 3 so as to be tiltable in a vehicle longitudinal direction via a reclining mechanism 4. A reference numeral 5 indicates a side shield. Meanwhile, the vehicle seat can include a train seat such as a tram or a Shinkansen, an airplane seat, and a vessel seat or the like, in addition to the automobile seat.

The seat back 2 has a seat surface 2A for dominantly supporting an occupant's upper body and side support portions 2S continuous to both sides of the seat surface 2A. The seat surface 2A is a substantially flat surface. The side support portions 2S are formed so as to integrally bulge toward the front of a vehicle than the seat surface 2A. Further, a headrest portion 2H for supporting an occupant's head is integrally formed above the seat surface 2A. The headrest portion 2H has a shape to be narrowed upward while drawing a smooth ridge line from both side support portions 2S.

The seat cushion 3 has a seat surface 3A for dominantly supporting an occupant's hip portion and side support portions 3S continuous to both sides of the seat surface 3A. The seat surface 3A is a substantially flat surface. The side support portions 3S are formed so as to integrally bulge upward than the seat surface 3A.

Figure 2:
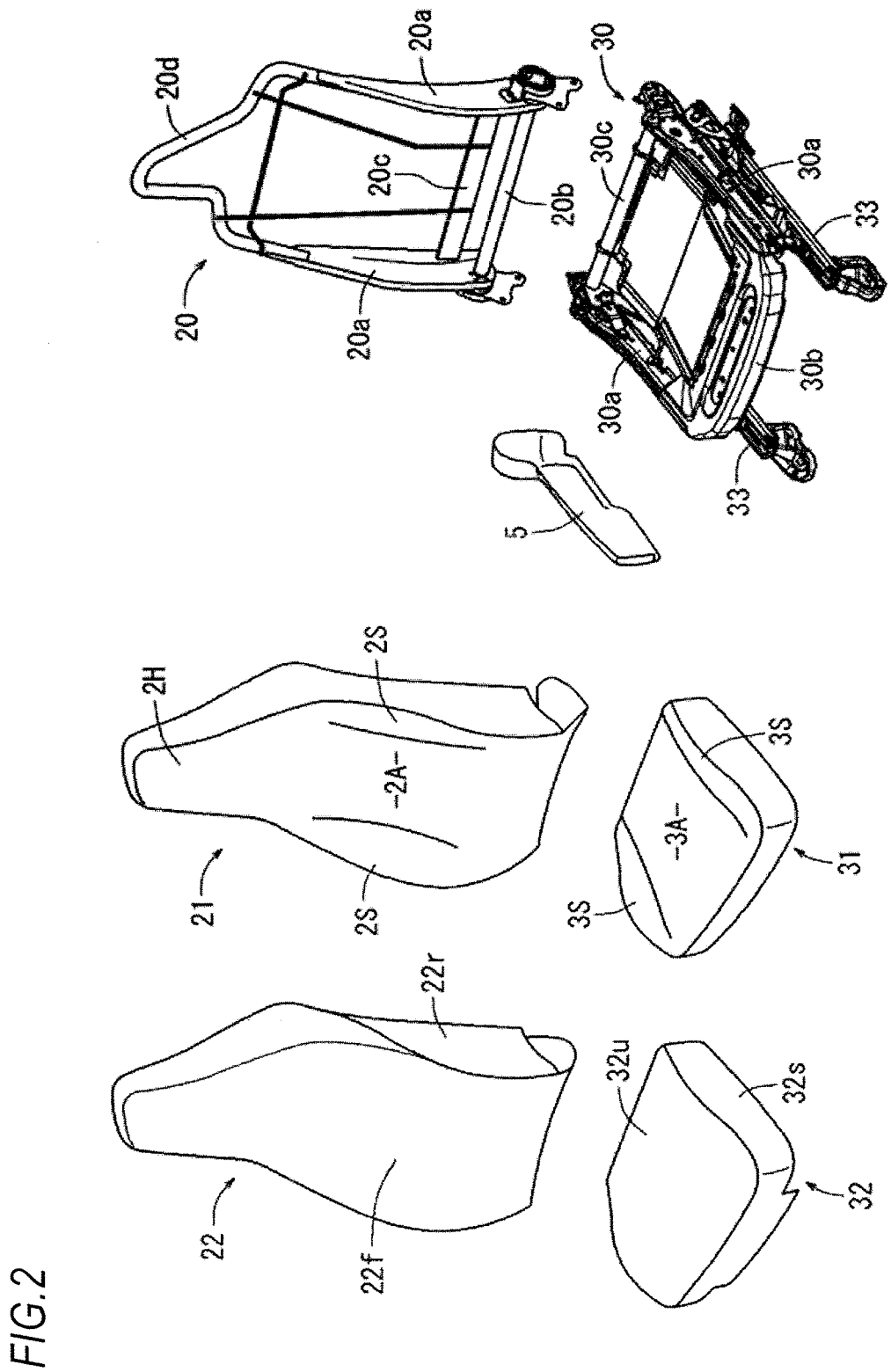
FIG. 2 is an exploded perspective view of the seat.

As shown in FIG. 2, the seat back 2 has a back frame 20 constituting a framework of the seat back 2, a back pad 21 as a cushion material, and a back cover 22 for covering the entire outer surface of the back pad 21. The back frame 20 is made of metal. A basic configuration of the back frame 20 is not particularly limited. The back frame 20 may have a basic configuration which is known in this kind of vehicle seat in related art. Specifically, the back frame 20 has two left and right side frames 20a, a connecting rod 20b connecting lower portions of the both side frames 20a, and a lower panel 20c, or the like. As the feature in the present embodiment, an upper frame 20d is integrally connected between upper ends of both side frames 20a. A central portion in a width direction of the upper frame 20d is bent upward to also serve as a framework of the headrest portion 2H.

The back pad 21 is made of resin foam such as polyurethane foam formed into a predetermined shape and defines a three-dimensional shape of the seat back 2. Therefore, the seat surface 2A, the both side support portions 2S, the headrest portion 2H and the seating surface of the seat back 2 are defined by the back pad 21. The seating surface configured by the seat surface 2A, an inside surface (center-side surface in the width direction) of the both side support portions 2S and a front surface of the headrest portion 2H. The back pad 21 corresponds to the seat pad of the present disclosure.

The back cover 22 is configured by two pieces including a front piece 22f for mainly covering the seating surface and a rear piece 22r for mainly covering a rear surface of the seat back 2. The front piece 22f and the rear piece 22r are sutured at their peripheral edges. The front piece 22f corresponds to the seating surface piece of the present disclosure. The rear piece 22r corresponds to the non-seating surface piece of the present disclosure. The back cover 22 corresponds to the seat cover of the present disclosure.

Figure 3:
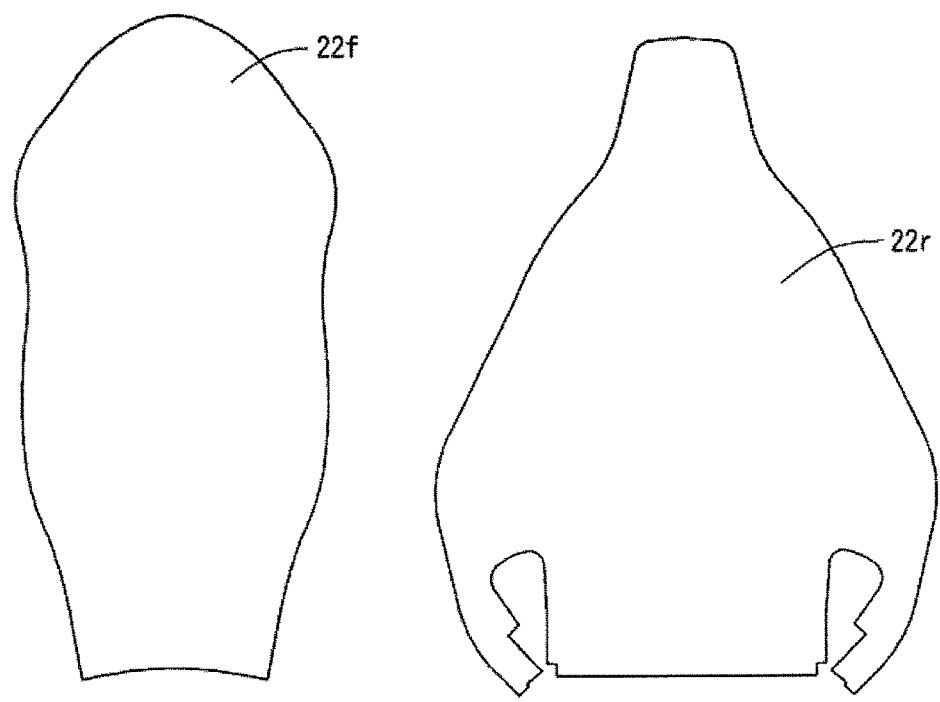
FIG. 3 is a development view of a seat back cover.

As shown also in FIG. 3, the front piece 22f is cut into a shape to cover a side surface of the seat back 2 extending from the top of the both side support portions 2S to the headrest portion 2H and an upper surface of the seat back 2 (headrest portion 2H), in addition to the seating surface. The rear piece 22r is cut into a shape to entirely cover the portion other than the portion covered by the front piece 22f.

As the material of the back cover 22, a fabric having an excellent stretchability over a back cover in related art is used. Specifically, in the back cover in the related art, a force of about 100 N is required to achieve a circular modulus of 10%. However, in the back cover 22 of the present embodiment, a force of about 20 N or less is sufficient to achieve the circular modulus of 10%. In order to express the excellent stretchability, the back cover 22 of the present embodiment is configured such that a weaving yarn is coarsely weaved by 20% to 30% over the back cover in the related art and a regular yarn made of PP or the like and a crimped yarn having a high stretchability are mixed in a ratio of 1:1.

Referring back to FIG. 2, the seat cushion 3 also has a cushion frame 30 constituting a framework of the seat cushion 3, a cushion pad 31 as a cushion material, and a cushion cover 32 for covering an upper surface and a side surface of the cushion pad 31. The cushion frame 30 is made of a metal. A basic configuration of the cushion frame 30 is not particularly limited. The cushion frame 30 may have a basic configuration which is known in this kind of vehicle seat in related art. Specifically, the cushion frame 30 has two left and right side frames 30a, a front panel 30b connecting front end portions of both side frames 30a, and a rear pipe 30c connecting rear end portions of both side frames 30a, or the like. Meanwhile, two left and right slide rails 33 are arranged on lower surface of the seat cushion 3 and fixed to a vehicle floor (not shown). In this way, the seat 1 is movable in the vehicle longitudinal direction.

The cushion pad 31 is made of resin foam such as polyurethane foam formed into a predetermined shape and defines a three-dimensional shape of the seat cushion 3. Therefore, the seat surface 3A, the both side support portions 3S and the seating surface of the seat cushion 3 are defined by the cushion pad 31. The seating surface is configured by the seat surface 3A and an inside surface (center-side surface in the width direction) of the both side support portions 3S. The cushion pad 31 also corresponds to the seat pad of the present disclosure.

The cushion cover 32 is configured by two pieces including a seating surface piece 32u for covering the seating surface and a side surface piece 32s for covering a side surface of the cushion pad 31. The seating surface piece 32u and the side surface piece 32s are sutured at their peripheral edges. The seating surface piece 32u is cut into a substantially quadrangle shape so as to cover the entire seating surface. The side surface piece 32s is cut into a strip-ring shape so as to cover the side surface of the cushion pad 31. Here, as the material of the cushion cover 32, a normal fabric, which is woven by a fiber similar to the PP fiber in related art, is used. The side surface piece 32s corresponds to the non-seating surface piece of the present disclosure. The cushion cover 32 corresponds to the seat cover of the present disclosure.

Figure 4:
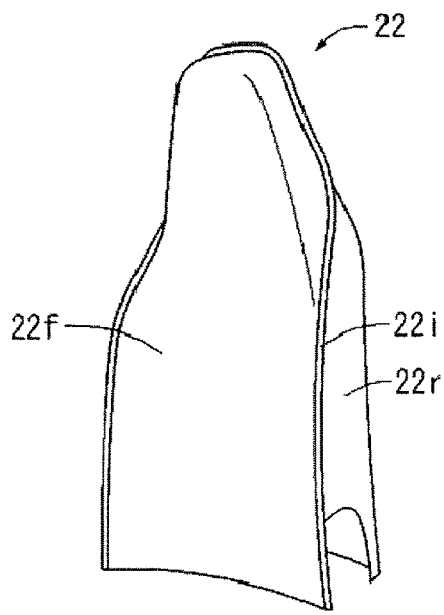
FIG. 4 is a perspective view of the seat back cover in a state of being turned inside out.
Figure 5:
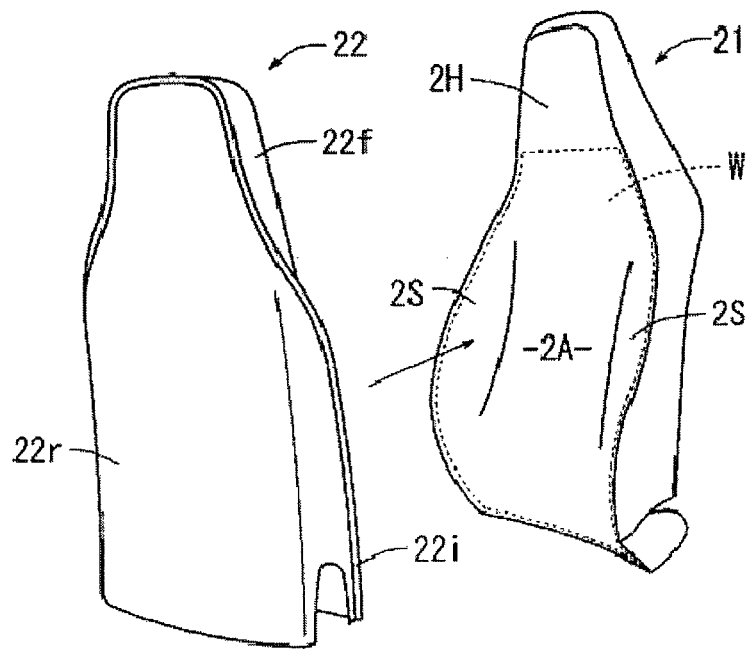
FIG. 5 is a perspective view showing a process of bonding the seat back cover to a back pad.

Next, a process of covering an outer surface of the back pad 21 with the back cover 22 is described. First, as shown in FIG. 4, the front piece 22f and the rear piece 22r are sutured in the state where the back cover 22 is turned inside out. A reference numeral 22i refers to a sutured portion. Subsequently, as shown in FIG. 5, an adhesive W is applied on predetermined regions of the back pad 21, and the back pad 21 and the back cover 22 are bonded by heat setting. At this time, the adhesive W is applied only on the seating surface other than the headrest portion 2H. That is, the adhesive W is applied only on the seat surface 2A and the inside surface of the both side support portions 2S. In FIG. 5 or the like, an application range (a bonding range of the back pad 21 and the back cover 22) of the adhesive W is shown in a dashed line.

Figure 6:
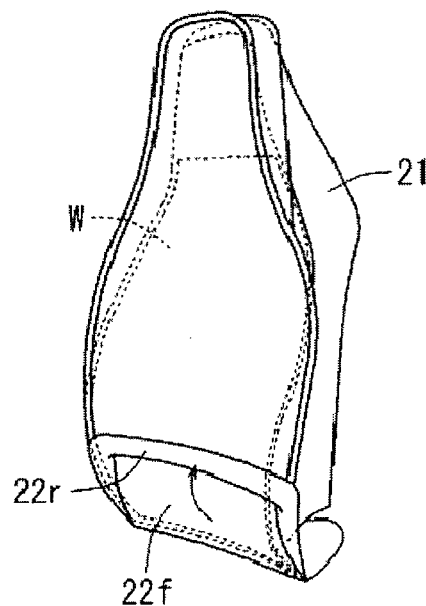
FIG. 6 is a perspective view showing a process of covering the back pad with the seat back cover.
Figure 7:
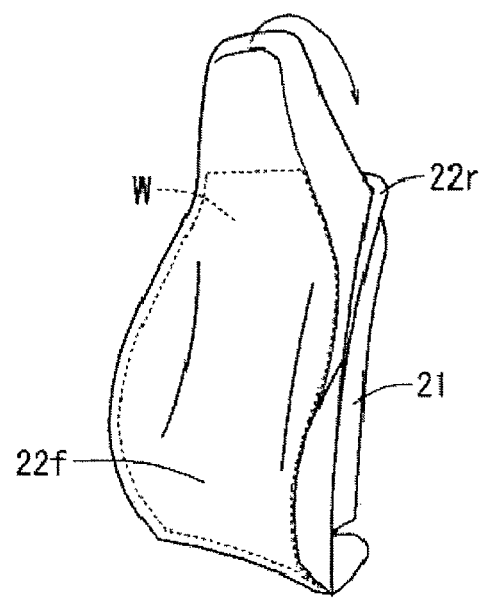
FIG. 7 is a perspective view showing a state which is further advanced from the state shown in FIG. 6.

Then, as shown in FIG. 6, the back cover 22 covers the back pad 21 while being turned inside out at a non-bonding portion. At this time, the back pad 21 and the back cover 22 are bonded to each other only at the seating surface except other than the headrest portion 2H, so that the portions other than the bonded portion have a high degree freedom for deformation. Therefore, as shown in FIG. 7, there is no case that the shape of the back pad 21 deforms or the wrinkle occurs in the back cover 22. Further, the back cover 22 can accurately and smoothly cover the back pad 21 while following the irregularities of the back pad 21.

Also in the seat cushion 3, the cushion pad 31 and the cushion cover 32 are bonded to each other only at the seating surface. Since the cushion cover 32 covers only the top surface and side surface of the cushion pad 31, it is sufficient that the cushion pad 31 is covered by the cushion cover 32 from the above.

The present disclosure provides illustrative, non-limiting aspects as follows:

According to an aspect of the disclosure, there is provided a seat cover of a vehicle seat configured to cover an outer surface of a seat pad, wherein a part of the seat cover which is configured to cover at least a seating surface of the seat pad consists of a seating surface piece made of a piece of cloth, and wherein, when covering the outer surface of the seat pad, the seat cover is bonded only to the seating surface.

That is, a seat cover of a vehicle seat for covering an outer surface of a seat pad is provided. The seat cover has a part configured to cover at least a seating surface of the seat pad. The part of the seat cover consists of only a seating surface piece made of a piece of cloth. That is, the seating surface of the seat pad is covered by only one piece. Here, the "seating surface" refers to a surface on which an occupant's body and the seat are in contact when the occupant is seated in a normal posture. Specifically, a front surface in the case of a seat back or a headrest corresponds to the seating surface, and an upper surface in the case of a seat cushion corresponds to the seating surface. Further, in the case where side support portions are provided so as to bulge at both sides of the seat, an inside surface (a plane direction center-side surface with a seating surface as a reference) with top portions of the side support portions as a border corresponds to the seating surface. Further, when covering the outer surface of the seat pad with the seat cover, the seat cover is bonded only to the seating surface.

In the above-described seat cover, it is preferable that a part of the seat cover other than the seating surface piece consists of a non-seating surface piece made of a piece of cloth, such that an entire seat cover is configured by two pieces of clothes.

As long as at least the seating surface is covered by one piece, the part of the seat cover other than the seating surface piece may be configured by several pieces. However, it is preferable the part of the seat cover other than the seating surface piece also consists of a non-seating surface piece made of a piece of cloth. That is, it is preferable that the entire seat cover is configured by two pieces of clothes.

In the above-described seat cover, it is preferable that a headrest portion configured to support a head of an occupant is integrally provided at a top portion of the seat pad, and, when covering the outer surface of the seat pad, the seat cover is not bonded to a seating surface of the headrest portion.

In the case where the seat pad is used as the seat back and a headrest portion configured to support a head of an occupant is integrally provided at a top portion of the seat pad, the seat pad and the seat cover may be bonded also at a front surface (seating surface) of the headrest portion. However, in the case where the headrest portion is integrally provided at the top portion of the seat pad, it is preferable the seat cover is not bonded to the seating surface of the headrest portion such that the seat cover is easily assembled with the seat pad when the outer surface of the seat pad is covered by the seat cover.

According to the seat cover of the present disclosure, at least the seating surface is covered by one piece, and hence, the number of pieces of the entire seat cover can be reduced. In this way, an effort for suturing each piece can be reduced. Further, the portion, which is not bonded to the seat pad, can be easily stretched or deformed. Therefore, in the case where the seat cover is bonded only to the seating surface when the seat pad is covered by the seat cover, the portion of the seat cover other than the bonded portion can sufficiently follow the irregular shape of the seat pad. As a result, it is possible to avoid a problem such as the shape deformation of the seat or the occurrence of wrinkles.

When the portion of the seat cover other than the portion of the seating surface piece also consists of only a non-seating surface piece made of a piece of cloth, the entire seat cover can be configured by two pieces. In this way, an effort for suturing each piece can be further reduced.

In the case where the headrest portion is integrally provided at the top portion of the seat pad, the seat cover can accurately follow a special irregular shape of the headrest portion when the seat cover is not bonded to the seating surface of the headrest portion.

According to another aspect of the disclosure, there is provided a vehicle seat including: a seat pad having a seating surface; and a seat cover covering an outer surface of the seat pad and including: a first piece of cloth entirely covering the seating surface of the seat pad; and a second piece of cloth covering a portion of the outer surface of the seat pad which is not covered by the first piece of cloth, wherein the seat cover is bonded only to the seating surface.

In the above-described vehicle seat, it is preferable that the seat cover consists of the first piece of cloth and the second piece of cloth.

In the above-described vehicle seat, it is preferable that the seat pad includes a seat portion and a headrest portion integrally connected to the seat portion and configured to support a head of an occupant, each of the seat portion and the headrest portion having a seating surface, and the seat cover is bonded to the seating surface of the seat portion and is not bonded to the seating surface of the headrest portion.

What is claimed is:

1. A vehicle seat, comprising:
   a seat back having a seat pad, wherein the seat pad has a front-facing seating surface configured to provide a back rest for an occupant; and
   a seat cover covering an outer surface of the seat pad and including:
   a first piece of cloth entirely covering the front-facing seating surface of the seat pad; and
   a second piece of cloth covering a portion of the outer surface of the seat pad which is not covered by the first piece of cloth,
   wherein the seat cover is bonded only to the front-facing seating surface,
   wherein the seat pad includes a seat portion and a headrest portion integrally connected to the seat portion and configured to support a head of the occupant, each of the seat portion and the headrest portion having a seating surface,
   wherein the first piece of cloth covers both the seat portion and headrest portion,
   wherein the first piece of cloth is bonded to the seating surface of the seat portion and is not bonded to the seating surface of the headrest portion, and
   wherein an opening portion is formed in the seat cover so as to wrap the seat pad.

2. The vehicle seat according to claim 1, wherein the seat cover consists of the first piece of cloth and the second piece of cloth.

* * * * *